B. C. SWINEHART.
CUSHION TIRE.
APPLICATION FILED JAN. 26, 1921.
1,402,190.
Patented Jan. 3, 1922.
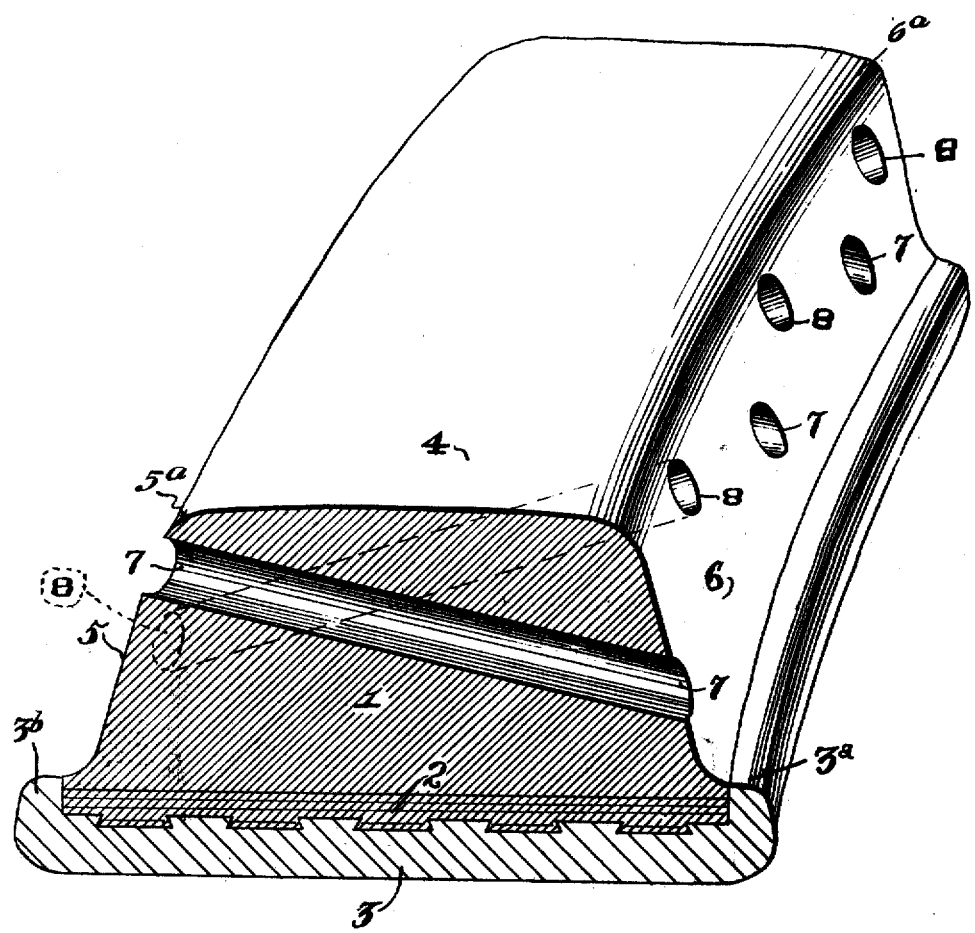

UNITED STATES PATENT OFFICE.

BENJAMIN C. SWINEHART, OF AKRON, OHIO.

CUSHION TIRE.

1,402,190.

Specification of Letters Patent.　Patented Jan. 3, 1922.

Application filed January 26, 1921. Serial No. 439,898.

*To all whom it may concern:*

Be it known that I, BENJAMIN C. SWINEHART, a citizen of the United States, residing at Akron, in the county of Summit and State of Ohio, have invented new and useful Improvements in Cushion Tires, of which the following is a specification.

This invention relates to certain new and useful improvements in elastic tires for wheels and has particular relation to an improved cushion tire which may be used to advantage on the wheels of automobiles, trucks or other vehicles.

It is an object of the invention to provide a tire body of simple, economical construction which when employed on wheels will be exceedingly durable, and will provide an efficient cushion therefor.

It is a further object of the invention to provide a tire composed of rubber, rubber composition or the like which is rendered more readily compressible by having openings which extend through the tire body from one lateral side to the other and arranged at an inclination to the axis of the tire so that water, sand or other substance will be expelled therefrom by centrifugal force when the tire is in motion and so that such substance will be drawn therefrom by the force of gravity when the tire is not in motion.

A still further object is to provide a tire body having a plurality of openings arranged transversely therethrough with the axes of adjacent openings disposed at an angle to each other and to thereby provide a tire body having areas of greater compressibility which are uniformly distributed throughout the tire.

A further object lies in the provision of a tire body of the class above indicated which is provided with ventilating passages arranged therein to provide a large amount of radiating surface and to thereby provide a tire which may be run at high speed without being injured by overheating.

An additional object is to provide a tire having transverse openings arranged at an inclination therethrough so as to increase the length of the openings and lessen the amount of rubber necessary to be used in the construction of the tire without in any way detracting from its strength or stability.

The above and additional objects are accomplished and other ends are attained by the novel construction, herein described and illustrated in the drawing, wherein I have shown an embodiment of the invention, it being understood that the invention is not confined to the particular embodiment shown, but is capable of various adaptions and that changes, variations and modifications may be made which come within the scope of the claims hereunto appended.

In the drawing which forms a part hereof I have shown a single figure which is a perspective view of a portion of a tire constructed in accordance with this invention and I have employed like characters of reference to designate the same or similar parts or things as the same occur at different points in the tire.

The particular adaption of the invention shown comprises an annular body 1, preferably composed of elastic rubber and having a hard rubber base 2, which is vulcanized to a suitable rim 3. The numeral 4 is used to denote the peripheral or tread face of the tire and the numerals 5 and 6 the lateral sides thereof. The lateral sides are inclined toward each other and the base 2 of the tire is relatively wider than the tread face 4. The lateral side 6 is curved at its outer circumferential edge 6ª to meet the tread face 4 and the outer circumferential edge 5ª of the lateral side 5 is likewise curved to meet the said tread face. The tire body is provided with a circumferentially extending series of holes or openings 7 and 8 which extend transversely through the tire body at an inclination to the axis of the tire. The said openings 7 and 8 are positioned in the tire body 1 in alternate relation and are alike in form, differing only as to the angle at which they project through the tire body. Each opening 7 is formed in the tire body so as to extend through the tire from a point adjacent the inner edge of the lateral face 6 to a point adjacent the outer edge 5ª of the alteral face 5.

Each opening 8 extends through the tire from a point adjacent the inner edge of the lateral face 5 to a point adjacent the outer edge 6ª of the lateral face 6. All of the openings 7 are inclined at a similar angle to the axis of the tire and the openings 8 are oppositely disposed at a similar angle to said axis so that the axis of each opening 7 is disposed at an angle to the axis of the adjacent openings 8. The openings 7 and 8 as shown in the drawings are in the form of cylindrical bores, but it is to be understood that the invention is not confined to any particular shape of openings.

It is also to be understood that while I have shown a preferred form of rim with the tire vulcanized thereto that the tire may be used with any form of rim and be secured thereto in any desired manner.

The cross sectional contour of a tire constructed in accordance with this invention may be varied to adapt it to various uses and the invention is not strictly confined to the particular shape of tire shown.

Having thus stated the objects of the invention and described the same in detail, I claim as new and desire to secure by Letters-Patent:

1. A cushion tire comprising an annular elastic body provided with a circumferentially extending series of holes which extend transversely therethrough, with the axes of the holes alternately disposed at an opposite angle to the axis of the tire.

2. A cushion tire comprising an annular elastic body provided with a plurality of holes each extending transversely therethrough at an inclination to the axis of the tire.

3. A cushion tire comprising an annular elastic body provided with a circumferentially extending series of regularly recurring holes each extending transversely therethrough at an inclination to the axis of the tire and with alternating holes oppositely inclined.

4. A cushion tire of the class described, having inclined lateral sides and provided with a circumferentially extending series of straight bores which extend therethrough at an inclination to the axis thereof from one lateral face of the tire to the other lateral face thereof.

5. In a tire of the class described, an annular elastic body, a plurality of laterally directed bores extending therethrough at an inclination to the axis thereof and in spaced relation to the tread face thereof.

In testimony whereof I have hereunto set my hand.

BENJAMIN C. SWINEHART.